Feb. 26, 1929.
O. A. KNOPP
1,703,345
PHASE SEQUENCE INDICATOR
Filed Sept. 16, 1927
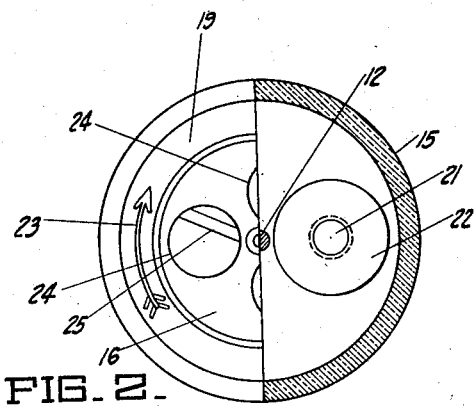
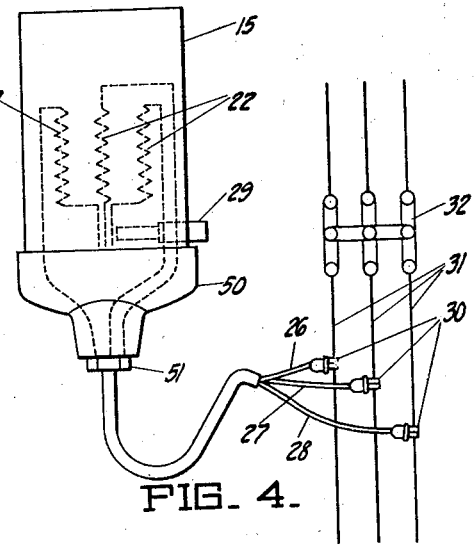
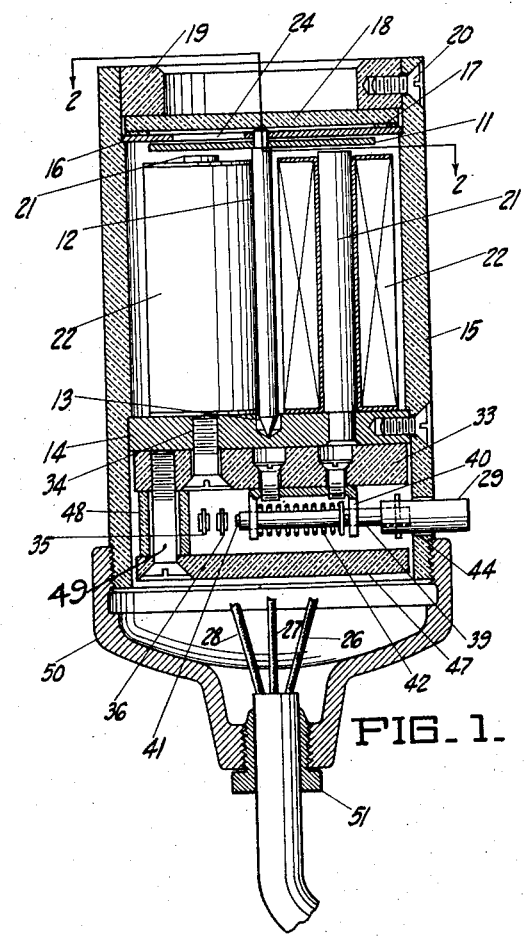
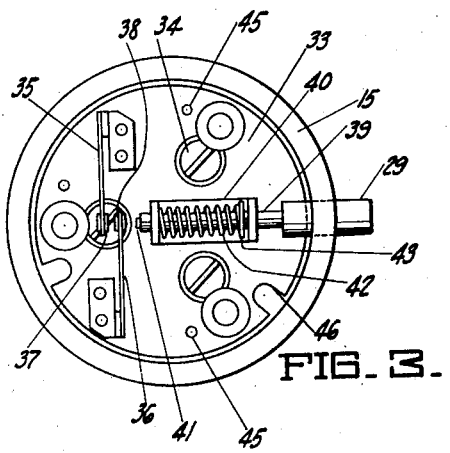
INVENTOR
Otto A. Knopp
BY John Flam
HIS ATTORNEY Patented Feb. 26, 1929.

1,703,345

UNITED STATES PATENT OFFICE.

OTTO A. KNOPP, OF OAKLAND, CALIFORNIA.

PHASE-SEQUENCE INDICATOR.

Application filed September 16, 1927. Serial No. 220,053.

This invention relates to polyphase electrical circuits, and particularly to a scheme whereby the sequence of the phases with respect to the lines can be determined.

In three phase systems, motors can be operated from the mains in either direction by simply interchanging the connections of two of the three lines going to the motor. In many installations, the direction of the motor rotation must be maintained. In such systems, inadvertent interchange of any of the mains feeding the motor, would cause serious damage. A lineman who is sent out to install for example a new feeder, or to repair or replace a transformer for a feeder, can easily make such an interchange without being aware of it.

It is one of the objects of my invention to make it possible for a lineman or the like easily to keep his mains in the same sequence after he is through with his work as they were before.

It is another object of my invention to provide a simple and compact instrument in general capable of performing these functions.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a sectional view of a phase sequence indicator embodying my invention;

Fig. 2 is a top plan view and half-section of the device, taken from plane 2—2 of Fig. 1;

Fig. 3 is a bottom view of the device, with some of the parts removed so as to indicate the structure more clearly; and Fig. 4 is a diagrammatic view showing how the device can be used.

In general, my device comprises a small induction motor that by its direction of rotation indicates the phase sequence. For this purpose a rotating disc 11 of conducting material is provided, fastened to a shaft 12. This shaft has a step bearing 13 at its lower end in a plate 14 that is fastened inside a cylindrical casing 15 of bakelite or other insulation material. The top of the shaft 12 is rotatable in a flat plate 16 disposed on a shoulder in casing 15. It is held in place by a gasket 17 over which a glass window 18 is placed. This window in turn is held tight against gasket 17 by the apertured cover 19, fastened as by one or more screws 20 to casing 15.

The disc 11 is arranged to be influenced by a rotating field set up in the well-known way by polyphase currents. Thus there are three evenly spaced cores 21 extending parallel to shaft 12 and supported as by upsetting the ends thereof in plate 14. Each core carries a field coil 22, and since these coils are spaced angularly around the shaft 12, they set up a rotating field when excited respectively by the three phases of a three phase system. In order to complete the magnetic circuits, parts 14 and 16 are made from magnetic material. Disc 11, influenced to rotate by this field can be made from hard copper.

As indicated by arrow 23 painted on cover 19, the rotation of disc 11 should be clockwise for comparison purposes; and if the rotation is reverse from this, the lineman interchanges two of his leads to coils 22.

In order that the operator may be able to see the direction of rotation, plate 16 has several large apertures 24, and disc 11 has painted thereon, a series of radial stripes 25 that are visible through these apertures.

The coils 22 are intended to be connected to the three phases of a distribution system in a manner illustrated diagrammatically in Fig. 4. The leads 26, 27, 28 are connected respectively to one terminal of the coils 22; and the other terminals are intended to be connected together as by push button 29 to form a neutral. Each lead carries a readily detachable clip 30 by the aid of which the lead can be connected to any of the lines 31. These lines are connected to the load, the source being connected to it through switch 32.

The lineman, before he starts dismantling or repairing a section fed through switch 32 for example, connects the instrument to the feeder lines 31 as shown. He presses button 29 and notes whether the disc 11 rotates in the direction of arrow 23. If it does not, he interchanges two of his leads 26, 27, 28. The direction is then as shown by arrows 23, even if at first it happened otherwise. He now marks the clips 30 as 1, 2, 3, or as $a$, $b$, $c$, and in such a way that he can replace them in the same order on feeders 31. He can then remove the clips and proceed with his work, such as the replacement of a transformer feeding line 31, or extension of the feeders, or repairing the feeder system. After he is through, he replaces clips 30 in the same order as marked, and presses button 29. If the disc 23 rotates clockwise, he knows that the load fed by lines 31 will have the same phase sequence as before the repairs. If the direction of rotation is reversed, he merely interchanges two of the lines 31 with respect to switch 32.

The push button switch is shown in detail in Figs. 1 and 3. This includes a switch base 33 of bakelite or the like, fastened to the bottom of plate 14 as by screws 34. This base carries a pair of contact spring arms 35 and 36, at the extremities of which there are contact points 37, 38. Normally these points are out of contact. There is a plunger 39 which is guided in a clip 40 and which is adapted to urge these contacts together. At the end of this plunger there is a third contact point 41 which is arranged to contact with point 38 and thereby to connect all three points together. A compression spring 42 on plunger 39 normally urges the contacts apart, one end abutting one of the legs of clip 40, and the other end abutting a collar 43 on plunger 39. The push button 29 fastened to the plunger extends through an aperture 44 in casing 15, for ready manual manipulation. One terminal of each of the coils 21 is connected respectively to the points 37, 38 and 41. The wires for these connections can be led through appropriate apertures such as 45, 46 in parts 14 and 33.

In order to cover the switch parts, a plate 47 of insulation material is spaced over the base 33, as by bushings or spacers 48 and screws 49. A metal casting 50 can also be provided at the bottom of casing 15 for protection. Leads 26, 27, 28 can enter through a clamp bushing 51 in the bottom of this casting and can be connected to coils 22 through apertures in parts 14, 33, and 47.

The clamp bushing grips the leads 26, 27, and 28, and if the lineman so desires, he can leave the instrument hanging by these leads from feeders 31 without danger of injuring the instrument. This mode of use would obviate the necessity for removing or marking clips 30 after the right direction of rotation of disc 11 is obtained.

I claim:

1. In an apparatus of the character described, a tubular casing, a window at one end of the casing, a rotatable element within the casing and visible through said window, coils arranged to provide a rotating magnetic field for influencing said element in the casing, and leads for the coils extending into the other end of the casing and clamped therein, whereby said leads can serve to support the instrument.

2. In a phase sequence indicator, a casing, a rotatable conductor in said casing, a plurality of coils arranged to provide a rotating magnetic field to influence said conductor and in said casing, and a push button switch controlling the circuit for said coils and operable exteriorly of the casing.

3. In a phase sequence indicator, a casing having a window at one end, a rotatable disc in the casing and visible through the window, a series of coils arranged to provide a rotating magnetic field for influencing the disc, a series of spring contacts controlling the coils, and a push button exterior of the casing for mechanically controlling said contacts.

4. In apparatus of the character described, a casing, a window on said casing, a rotatable conducting disc adjacent the window, a shaft for the disc, a bearing plate both at the top and the bottom of the shaft and secured inside the casing, a series of coils for producing a rotating magnetic field to influence the disc and to urge it to rotate, said disc being free to continue its motion indefinitely under the influence of said field, and a switch controlling the coils carried by the bottom bearing plate and having a manually operable member extending out of the casing.

5. The combination as set forth in claim 4, in which the upper bearing plate is located between the disc and the window, and is provided with an aperture through which the disc is visible.

In testimony whereof I have hereunto set my hand.

OTTO A. KNOPP.